US012612179B2

(12) United States Patent
Torturo et al.

(10) Patent No.: US 12,612,179 B2
(45) Date of Patent: Apr. 28, 2026

(54) CLOUD-BASED SERVER AND AIRCRAFT BLACK BOX INFORMATION STORAGE SYSTEM

(71) Applicants: John Torturo, Islip Terrace, NY (US); Elba Figueroa, Islip Terrace, NY (US)

(72) Inventors: John Torturo, Islip Terrace, NY (US); Elba Figueroa, Islip Terrace, NY (US)

( * ) Notice: Subject to any disclaimer, the term of this patent is extended or adjusted under 35 U.S.C. 154(b) by 310 days.

(21) Appl. No.: 18/311,441

(22) Filed: May 3, 2023

(65) Prior Publication Data

US 2024/0101271 A1     Mar. 28, 2024

Related U.S. Application Data

(60) Provisional application No. 63/409,278, filed on Sep. 23, 2022.

(51) Int. Cl.
*B64D 45/00* (2006.01)
*G07C 5/00* (2006.01)

(52) U.S. Cl.
CPC ............. *B64D 45/00* (2013.01); *G07C 5/008* (2013.01); *B64D 2045/0065* (2013.01)

(58) Field of Classification Search
CPC . B64D 45/00; B64D 2045/0065; G07C 5/008
See application file for complete search history.

(56) References Cited

U.S. PATENT DOCUMENTS

| | | | |
|---|---|---|---|
| 8,489,259 B2 | 7/2013 | Vinue Santolalla | |
| 9,221,551 B2 | 12/2015 | Leroy | |
| 10,713,956 B2 | 7/2020 | Miller | |
| 2012/0166037 A1 | 6/2012 | Antolalla | |
| 2013/0317673 A1 | 11/2013 | Leroy | |
| 2016/0260264 A1* | 9/2016 | Shih ....................... | B64D 45/00 |
| 2018/0229856 A1* | 8/2018 | Agrawal ................ | G06Q 10/10 |
| 2019/0043369 A1 | 2/2019 | Miller | |
| 2019/0371084 A1* | 12/2019 | Krupa .................. | G07C 5/0808 |

* cited by examiner

*Primary Examiner* — Steven Vu Nguyen
(74) *Attorney, Agent, or Firm* — Brennan, Manna & Diamond, LLC

(57) ABSTRACT

The present invention relates to a novel cloud-based server storage system for aircrafts' black box data. The cloud-based server is connected to the black box of aircrafts via a secure satellite communication channel for receiving black box data in real-time. The received black box data is securely stored in a memory module of the server along with identifying information including, but not limited to, aircraft tail number, flight number, timestamp, and more. In some embodiments, the system compares the black box data with baseline metrics for identifying distress conditions in the aircraft for enabling authorities to take quick corrective actions. In some embodiments, an alert is generated and transmitted to a cockpit and to authorities (i.e., air traffic control). The data is securely transmitted between the aircraft and the cloud-based server.

10 Claims, 4 Drawing Sheets

302 — Receive black box information from aircraft

304 — Transform received information into digital form

306 — Store transformed information in memory unit

308 — Compare with baseline

310 — No action or alert

312 — Automatic audible or visual alert generated

CLOUD-BASED SERVER AND AIRCRAFT BLACK BOX INFORMATION STORAGE SYSTEM

CROSS-REFERENCE TO RELATED APPLICATION

The present application claims priority to, and the benefit of, U.S. Provisional Application No. 63/409,278, which was filed on Sep. 23, 2022, and is incorporated herein by reference in its entirety.

FIELD OF THE INVENTION

The present invention relates generally to the field of aircraft black box system. More specifically, the present invention relates to a novel cloud-based server storage system for aircraft black box data. The system hosts a cloud-based server for aircraft black boxes. The system offers immediate investigation of information through cloud technology to take quick corrective action by regulatory authorities and aviation maintenance services. The system records the entire flight off-site including instrument data, conversations, and settings. Accordingly, the present disclosure makes specific reference thereto. Nonetheless, it is to be appreciated that aspects of the present invention are also equally applicable to other like applications, devices, and methods of manufacture.

BACKGROUND

By way of background, the Black Box, also technically known as Flight Data Recorder (FDR), is an instrument that records all the activities of an airplane/aircraft during its flight. An airplane generally houses two black boxes, one at the front and another at the back of an aircraft. The flight data recorder(s) is designed to record the operating data from the plane's systems. There are sensors wired from various areas on the plane to the flight-data acquisition unit, which is wired to the FDR. Parameters recorded or acquired include, but are not limited to, time, pressure, altitude, airspeed, vertical acceleration, magnetic heading, control-column position, rudder-pedal position, control-wheel position, horizontal stabilizer, fuel flow, and more recorded in black box. Conventional black boxes can have magnetic tapes or solid-state memory for storage of data acquired from the airplane. The cockpit voice recorder serves to document not just the voices of the pilots, but also any general noises in their vicinity (such as audible warnings).

FDRs normally have crash-survivable memory units (CS-MUs). The CSMU is a large cylinder that bolts onto the flat portion of the recorder. The black boxes are made of stainless steel or titanium and made to withstand high impact velocity or a crash impact of 3,400 Gs and temperatures up to 2000 degrees F. (1,100 degrees C.) for at least 30 minutes. The recorders inside are wrapped in a thin layer of aluminum and a layer of high-temperature insulation. FDRs and cockpit voice recorders are fitted with locator beacons. These broadcast their location for up to 30-days, even when submerged as deep as 6,000 meters (20,000 ft) underwater, which increases their chance of being found.

Physical black boxes are the only storage device having critical information about aircraft operations/functions. However, it may take days, weeks, or even months for the black box to be recovered from a crash site. This delays the rescue operation and analysis of root cause of the crash. Also, despite the black box being mostly indestructible, portions of it still may end up damaged. In situations where the airplane is lost, black boxes are not retrieved and data is not accessible. Aviation experts and aviation industry executives desire an improved way of storing black box data that eliminates the shortcomings of the conventional physical black boxes.

Therefore, there exists a long-felt need in the art for a system that securely stores the airplane information. There is also a long-felt need in the art for a system that overcomes the disadvantages associated with conventional black boxes and cockpit voice recorders. Additionally, there is a long-felt need in the art for a system that enables immediate investigation of information in cases of an airplane crash/loss. Moreover, there is a long-felt need in the art for a system that enables aviation experts to take quick corrective actions in case of an airplane crash/loss. Further, there is a long-felt need in the art for a system that enables storage of aircraft operation data remotely away from the airplane. Finally, there is a long-felt need in the art for a system that saves lives and improves safety of any aircraft flight with passengers or cargo.

The subject matter disclosed and claimed herein, in one embodiment thereof, comprises an aircraft black box system. The system provides commercial aircrafts with a cloud-based server system that hosts information transmitted from the aircraft's black box. The system comprising of a black box device installed in an aircraft, the black box includes a flight data recorder and a cockpit voice recorder, a cloud-based server in communication with the black box device via a secure satellite communication channel, the server configured to obtain information from the black box device in real-time, the information includes the entire flight data including instrument data, conversations, and settings, and recording the obtained information securely in a memory unit thereof. The stored information can be used by aviation maintenance services and regulatory authorities.

In this manner, the cloud-based server black box system of the present invention accomplishes all of the forgoing objectives and provides users with a cloud-based server system that hosts information transmitted from the aircraft's black box. The black box information is readily available in real time and can be used for immediate investigation to take quick corrective action. The information remains secure and is secured in the cloud-based server. The system records the entire flight data off site including instrument data, conversations, and settings.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a cloud-based aircraft black box data storage system. The system comprising a flight data recorder installed inside an aircraft and capable of capturing flight data, a cockpit voice recorder installed inside a cockpit of the aircraft and capable of recording cockpit sounds, a control module installed inside the aircraft for receiving data captured by the flight data recorder and the cockpit voice recorder, a communication module housed inside the control module for transmitting the data captured by the control module to a cloud-based data center through a satellite communication channel in real-time, the data center has a memory unit for storing the data received from the communication module, wherein the data is stored along with a timestamp, tail number of the aircraft, and flight number.

In yet another embodiment, the communication module uses at least one of C-band (6/4 GHz), Ku-band (14/12 GHz) or Ka-band (40/26 GHz) for transmitting the flight data recorder data and the cockpit voice recorder data to the data center.

The subject matter disclosed and claimed herein, in one embodiment thereof, comprises a cloud black box system for aircrafts. A cloud-based server is configured to receive black box information in real-time from an aircraft via a satellite communication channel. The black box information is stored in a memory unit of the cloud-based server along with tail number, flight number, and timestamp, wherein the stored information in the memory unit is compared with a baseline metric in real time and an alert is generated if the comparison shows a distress or malfunction condition with the aircraft.

In yet another embodiment, a notification is sent, by the cloud-based server, to aviation authorities indicating the distress condition so that a quick corrective action is taken.

In another aspect of the present invention, an audible or visual alert is transmitted to the cockpit of the aircraft.

In yet another embodiment, a method of instantly obtaining black box data of an aircraft is described. The method includes the steps of hosting a cloud-based server for aircraft black box, the black box including flight data recorder and cockpit voice recorder; obtaining, by the cloud-based server, information from the aircraft's black box in real-time via a satellite communication channel; storing, securely by a memory unit of the cloud-based server, black box data along with airline, flight, and tail numbers; and, comparing the stored data in the memory unit with baseline metrics for determining a distress condition in the aircraft.

In yet another embodiment, an aircraft black box system is disclosed. The system comprising of a black box device installed in an aircraft, a cloud-based server in communication with the black box device, the server configured to obtain information from the black box device in real-time, the information includes the entire flight data including instrument data, conversations, and settings, and recording the obtained information securely in a memory unit thereof.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
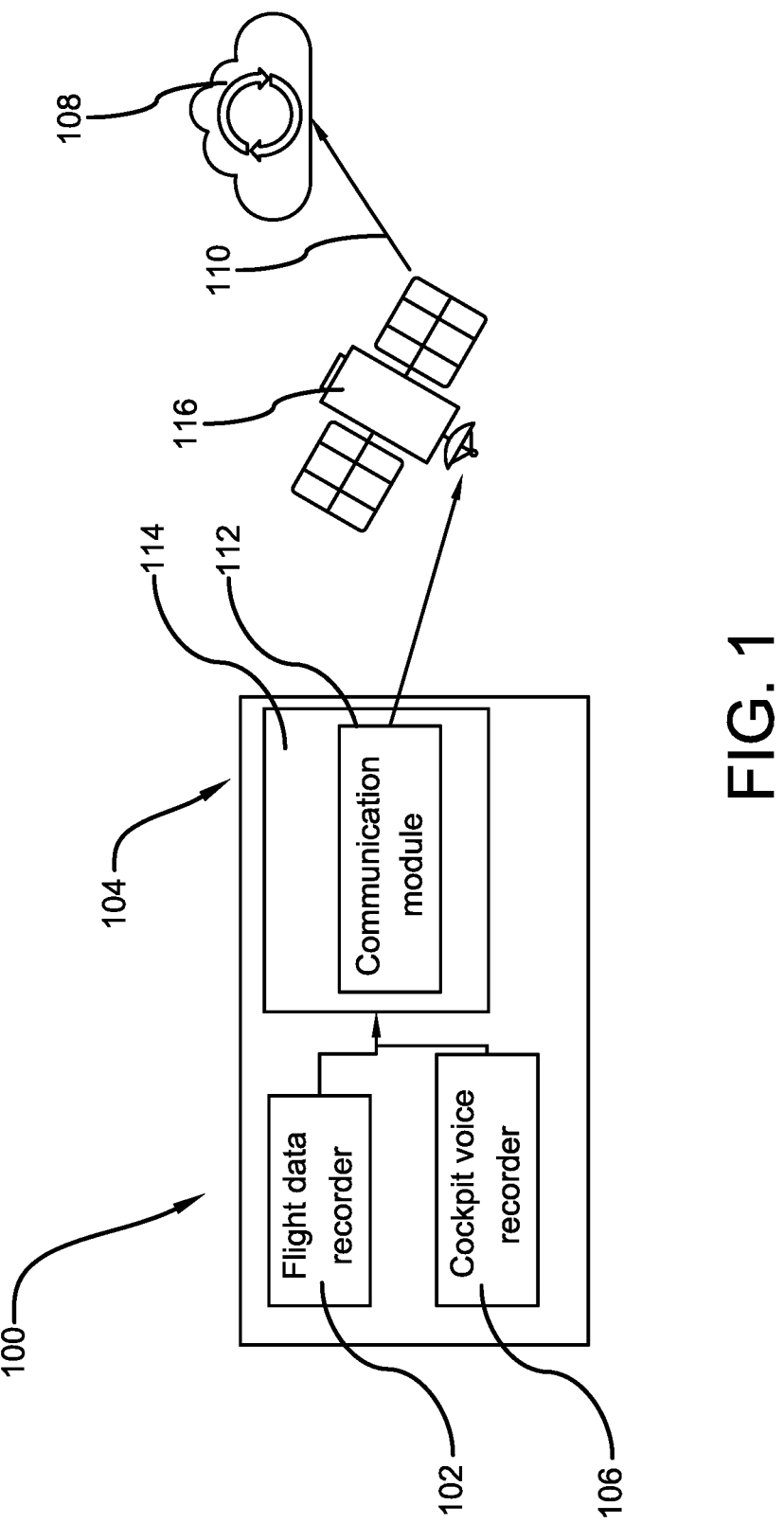
FIG. 1 illustrates a schematic view of one potential embodiment of a cloud-based black box data storage system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a system that securely stores the airplane information. There is also a long-felt need in the art for a system that overcomes the disadvantages associated with conventional black boxes and cockpit voice recorders. Additionally, there is a long-felt need in the art for a system that enables immediate investigation of information in case of an airplane crash/loss. Moreover, there is a long-felt need in the art for a system that enables aviation experts to take quick corrective actions in case of an airplane crash/loss. Further, there is a long-felt need in the art for a system that enables storage of aircraft operation data remotely away from the airplane. Finally, there is a long-felt need in the art for a system that saves lives and improves safety of any aircraft flight with passengers or cargo.

The present invention, in one exemplary embodiment, is a cloud-based aircraft black box data storage system. The system comprising a black box device installed inside an aircraft and capable of capturing flight data and cockpit sounds, a control module installed inside the aircraft for receiving black box data, a communication module housed inside the control module for transmitting the black box data to a cloud-based data center through a satellite communication channel in real-time, the data center has a memory unit for storing the data received from the communication module, wherein the data is stored along with a timestamp, tail number of the aircraft, and flight number.

In the present disclosure, the "black box" is comprised of at least two separate pieces of equipment and data sources: a flight data recorder (FDR) and a cockpit voice recorder (CVR). Data of both the flight data recorder and the cockpit voice recorder together are considered as the black box data.

Referring initially to the drawings, FIG. 1 illustrates a schematic view of one potential embodiment of a cloud-based black box data storage system of the present invention in accordance with the disclosed architecture. The black box data storage system 100 of the present invention is configured to provide commercial aircrafts with a cloud-based server system that hosts information transmitted from the aircraft's black box. The system 100 includes a connected flight data recorder 102 positioned inside an aircraft 104 for recording the aircraft operations/functions and data similar to a conventional flight data recorder. A connected cockpit voice recorder 106 is positioned inside the cockpit of the aircraft 104 for recording cockpit sounds.

The connected flight data recorder 102 and the voice recorder 106 are configured to send recorded data in real-time basis to a cloud-based data center 108 through a satellite communication channel 110 established through a satellite communication module 112 installed inside the aircraft 104. A control module 114 stores the communication module 112 and is further configured to transform the received information from the flight data recorder 102 and the voice recorder 106 into a predetermined protocol to support satellite communication to the data center 108. It should be noted that communication between the communication module 112 and the data center 108 is facilitated through one or more satellites 116 positioned in the atmosphere for facilitating satellite communication.

The satellite communication module 112 provides seamless connectivity between the aircraft 104 and the data center 108. The data center 108 is configured to receive black box data from a plurality of aircrafts and the system 100 can be maintained by an aircraft service provider for a fleet of aircrafts or by aviation authorities for all the aircrafts. The system 100 not only enables critical information to be stored directly in the flight data recorder 102 and the cockpit voice recorder 106 but also enables direct and real-time transmission of information to the data center 108.

It should be noted that all the conventional parameters including, but not limited to, fuel levels, altitude, engine performance, temperature, direction, speed, turbulence, control-wheel position, and more are monitored by the system 100 and are stored remotely in the data center 108 and locally inside the flight data recorder 102 and the cockpit voice recorder 106.

Figure 2:
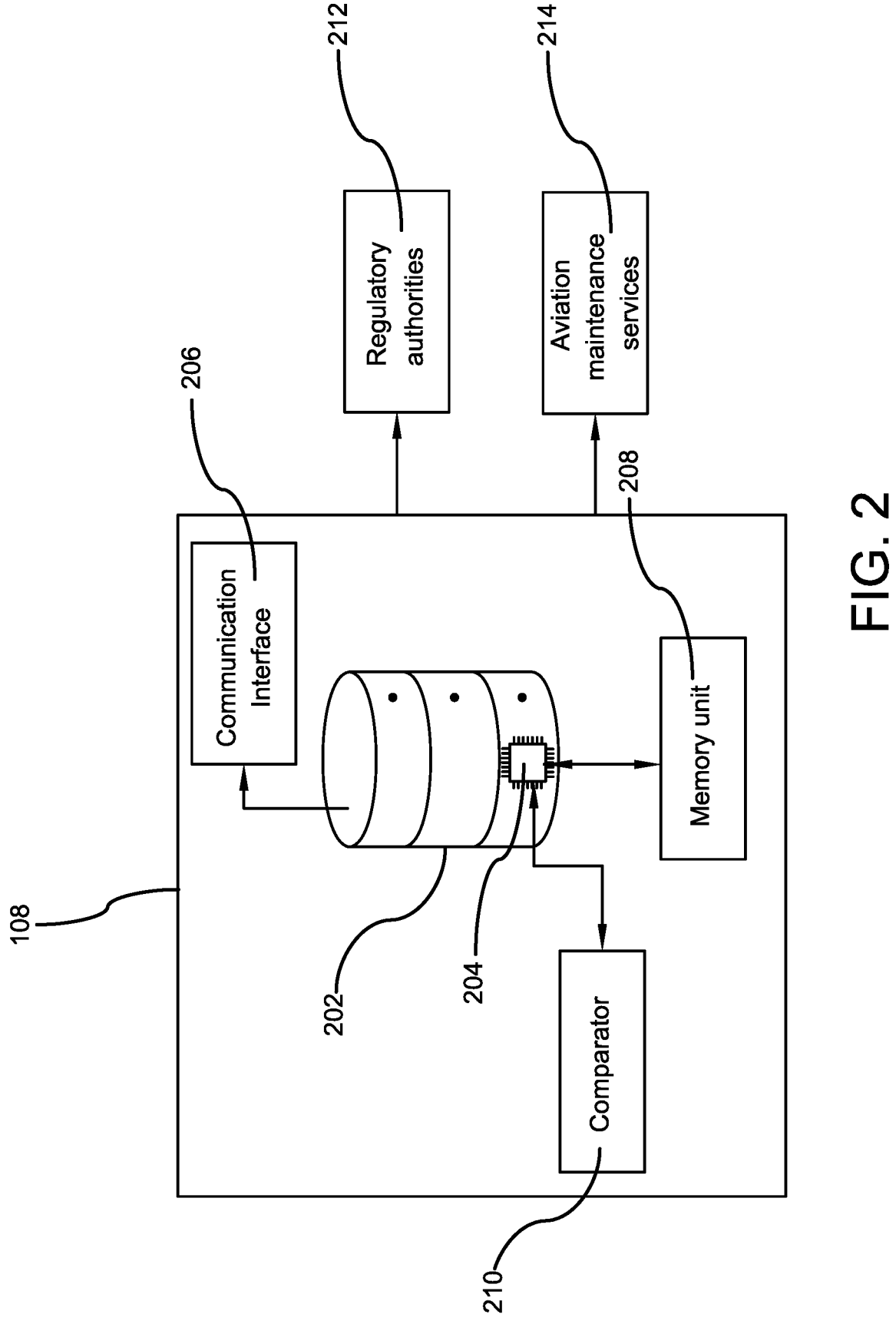
FIG. 2 illustrates a functional block diagram of the data center showing the essential functional components of the data center in accordance with the disclosed architecture.

FIG. 2 illustrates a functional block diagram of the data center 108 showing the essential functional components of the data center 108 in accordance with the disclosed architecture. The data center 108, in one exemplary embodiment, is a cloud-based data center that can be configured as a private cloud or a hybrid cloud. Preferably, the data center 108 includes one or more servers 202 that includes a processor 204 for processing the incoming black box information from the aircrafts. While the foregoing describes a single proces sor 204, as one of ordinary skill in the art will recognize, the server 202 may comprise multiple processors operating in conjunction with one another to perform the functionality described herein.

The server 202 has a communication interface 206 for transmitting and/or receiving data from the aircraft 104 through the satellite communication. A memory unit 208 preferably in the form of stacked solid-state memory boards is configured to store flight data along with cockpit voice recorder data. A comparator unit 210 is installed in the data center 108 and is configured with different baseline or safety metrics for different types of aircrafts. The comparator unit 210 is configured to continuously compare the stored information in the memory unit 208 with baseline metrics for indicating any malfunctioning with the aircraft.

The data center 108 is also connected to a number of third-parties including, but not limited to, regulatory authorities 212 and aviation maintenance services 214. The black box data stored in the memory unit 208 can also be used for scheduling maintenance and ascertaining quality controls of the aircrafts by the maintenance services 214.

Figure 3:
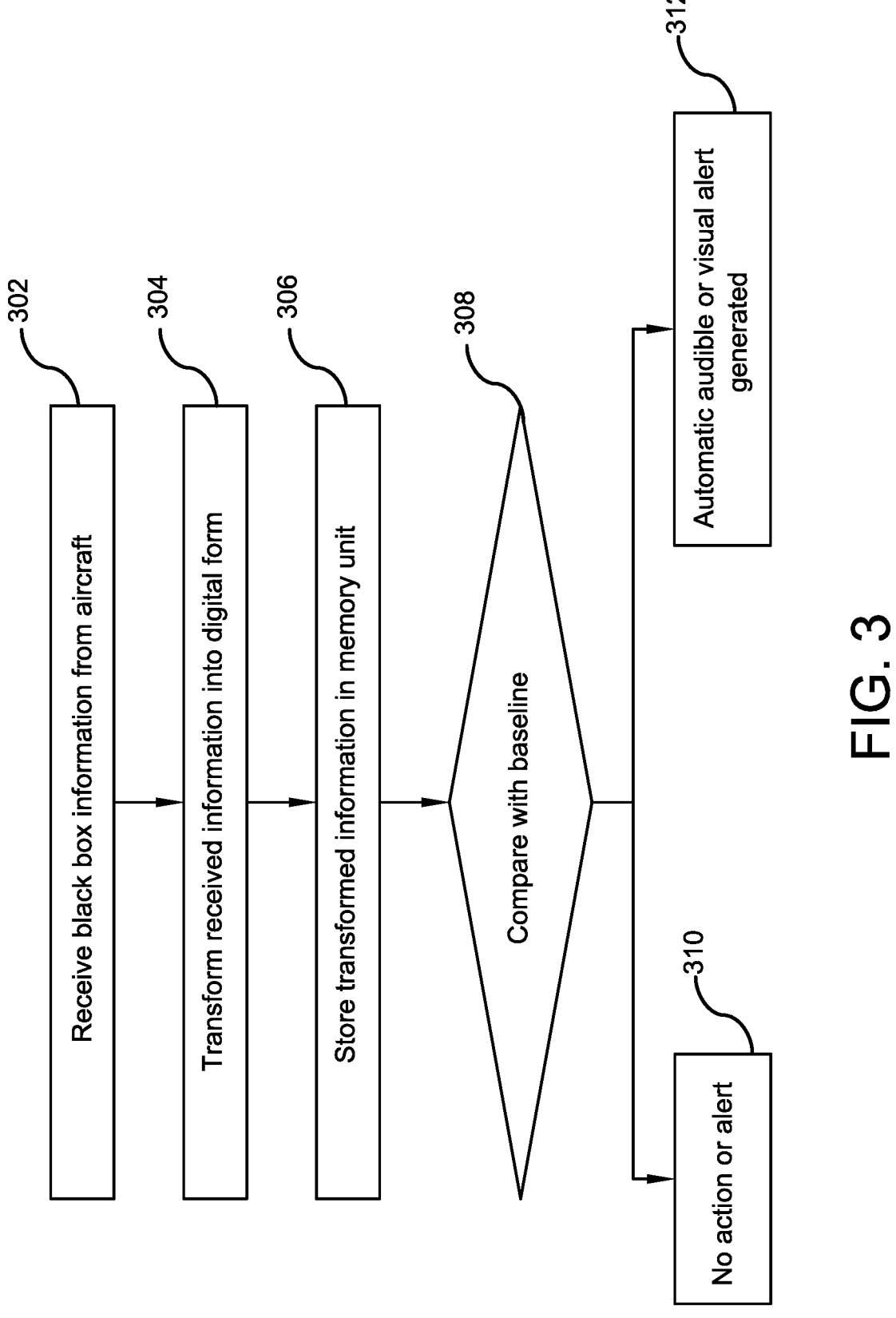
FIG. 3 illustrates a flow diagram depicting a process of storage and analysis of the aircraft information at the data center of the cloud-based black box data storage system of the present invention in accordance with the disclosed architecture.

FIG. 3 illustrates a flow diagram depicting a process of storage and analysis of the aircraft information at the data center of the cloud-based black box data storage system 100 of the present invention in accordance with the disclosed architecture. Initially, the black box information is received by the data center from the control module positioned inside the aircraft through a satellite channel (Step 302). Then, the received information is transformed into a conventional format in which the information is locally stored inside the flight data recorder 102 and the cockpit voice recorder 106 (Step 304). Thereafter, the received information is stored in the solid-state memory or any other type of persistent memory inside the data center along with a tail number, a flight number, and a timestamp (Step 306).

The received data is continuously compared with a predetermined baseline metric for the tail number (Step 308). In situations where the stored information is in sync with the baseline metric, no action or alert is generated by the data center (Step 310). In situations where the stored information does not match with the baseline metric, a distress condition is detected and an automatic alert is generated and is transmitted to the cockpit of the aircraft whose tail number is associated with the information (Step 312). The alert can be visual or audible and can include an indication of a potential problem based on the received black box data. In some embodiments of the present invention, aviation authorities are also informed automatically about the possible malfunctioning in the aircraft or a distressed condition.

Figure 4:
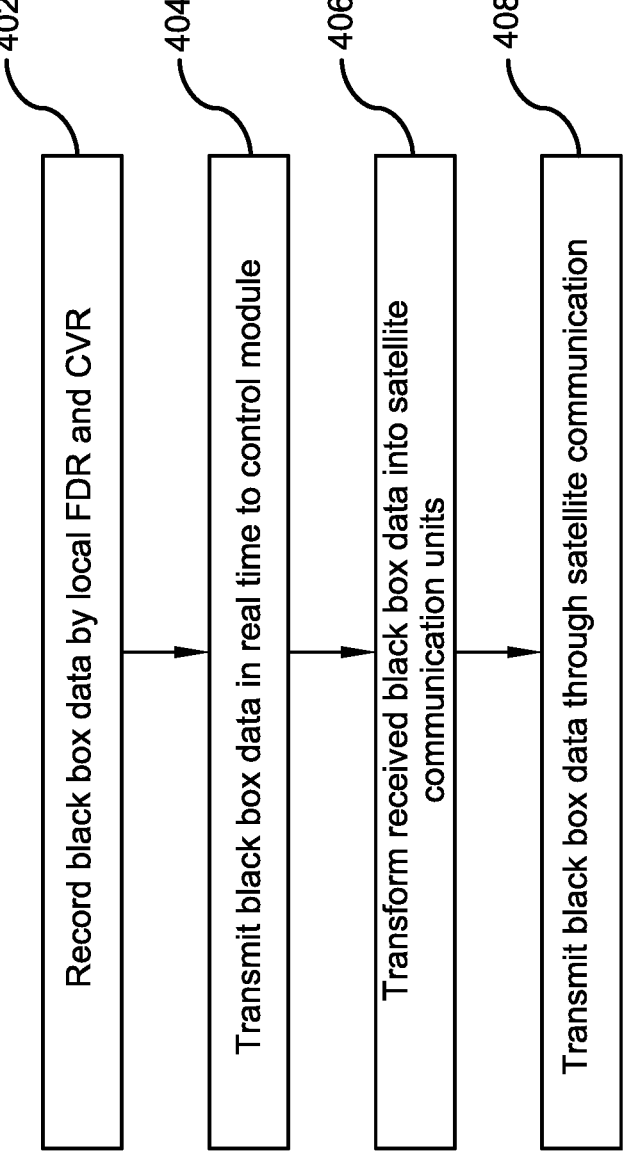
FIG. 4 illustrates a flow diagram depicting a process of capturing and transmitting black box data from the aircraft to the data center in accordance with the disclosed architecture.

FIG. 4 illustrates a flow diagram depicting a process of capturing and transmitting black box data from the aircraft to the data center in accordance with the disclosed architecture. Initially, the connected FDR and CVR start capturing the black box data in real time (Step 402). The system starts capturing black box data as soon as the engine of the aircraft starts. Then, in real-time, the captured black box data is transmitted to the control module installed in the aircraft (Step 404). The control module is configured to code the received information into a predetermined protocol (Step 406) enabling the communication interface to transmit the coded information to the data center (Step 408). It should be noted that tail number, flight number, and time stamp are also transmitted along with the coded information for uniquely identifying the data in the data center.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "cloud-based black box data storage system", "black box data storage system", and "system" are interchangeable and refer to the cloud-based black box data storage system 100 of the present invention.

Notwithstanding the forgoing, the cloud-based black box data storage system 100 of the present invention can be of any suitable configuration as is known in the art without affecting the overall concept of the invention, provided that it accomplishes the above-stated objectives. One of ordinary skill in the art will appreciate that the cloud-based black box data storage system 100 as shown in the FIGS. are for illustrative purposes only, and that many other configurations, components, and designs of the cloud-based black box data storage system 100 are well within the scope of the present disclosure. Although the mentioned components of the cloud-based black box data storage system 100 are important design parameters for user convenience, the cloud-based black box data storage system 100 may contain any additional components that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cloud-based black box data storage system comprising:
    a black box data storage system having a cloud-based data center, a satellite communication module, a satellite communication channel, a flight data recorder, and a cockpit voice recorder; and
    wherein said satellite communication module, said flight data recorder, and said cockpit voice recorder positioned inside an aircraft;
    wherein said flight data recorder records aircraft function data;
    wherein said cockpit voice recorder records cockpit communication data;
    wherein said flight data recorder and said cockpit voice recorder send said aircraft function data and said cockpit communication data in real-time to said cloud-based data center through said satellite communication channel established through said satellite communication module;
    wherein said cloud-based data center is configured to receive said aircraft function data from said flight data recorder and said cockpit communication data from said cockpit voice recorder;
    wherein said aircraft function data comprises a fuel level, an engine performance, a turbulence, and a control-wheel position; and wherein said cloud based data center comprises a communication interface, a plurality of stacked solid-state memory boards, and a comparator unit.

2. The cloud-based black box data storage system of claim 1, wherein said cockpit voice recorder further records cockpit sounds.

3. The cloud-based black box data storage system of claim 1 further comprising a satellite for communicating between said aircraft and said cloud-based data center, wherein said satellite is positioned in the atmosphere.

4. The cloud-based black box data storage system of claim 3, wherein said satellite communication module provides connectivity between said aircraft and said cloud-based data center.

5. A method of recording and storing aircraft black box data, the method comprising the steps of:
    providing a black box data storage system having a cloud-based data center, a satellite communication module, a satellite communication channel, a flight data recorder, and a cockpit voice recorder;
    positioning said satellite communication module, said flight data recorder, and said cockpit voice recorder inside an aircraft;
    recording said flight data recorder having aircraft function data;
    recording said cockpit voice recorder having cockpit communication data;
    sending said aircraft function data from said flight data recorder in real-time to said cloud-based data center through said satellite communication channel established through said satellite communication module;
    sending said cockpit communication data from said cockpit voice recorder in real-time to said cloud-based data center through said satellite communication channel established through said satellite communication module;
    receiving at said cloud-based data center said aircraft function data from said flight data recorder and said cockpit communication data from said cockpit voice recorder, wherein said aircraft function data comprises a fuel level, an engine performance, a turbulence, and a control-wheel position; and
    wherein the cloud-based data center comprises a communication interface, a plurality of stacked solid-state memory boards, and a comparator unit.

6. The method of claim 5 further comprising a step of storing said aircraft function data and said cockpit communication data in said cloud-based data center.

7. The method of claim 6 further comprising a step of transforming said aircraft function data from said flight data recorder into an aircraft function protocol.

8. The method of claim 7 further comprising a step of transforming said cockpit communication data from said cockpit voice recorder into a cockpit protocol.

9. The method of claim 8 further comprising a step of communicating between said aircraft and said data center with a satellite, wherein said satellite is positioned in the atmosphere.

10. The method of claim 9, wherein said satellite communication module provides connectivity between said aircraft and said cloud-based data center.

* * * * *